(No Model.) 4 Sheets—Sheet 1.
J. F. PACKER.
HARROW.
No. 498,295. Patented May 30, 1893.
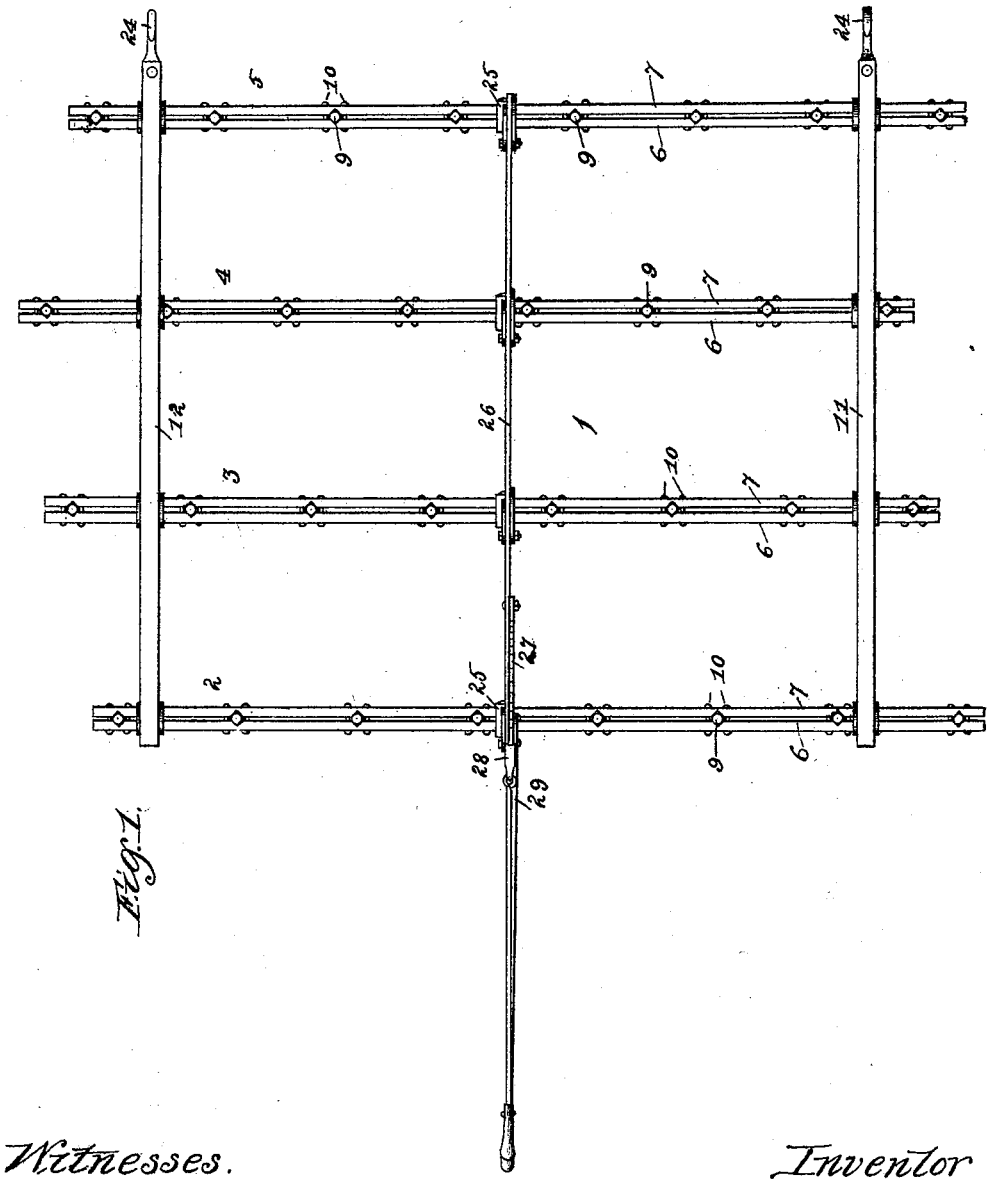
Witnesses.
Inventor
John F. Packer (No Model.) 4 Sheets—Sheet 2.
J. F. PACKER.
HARROW.
No. 498,295. Patented May 30, 1893.
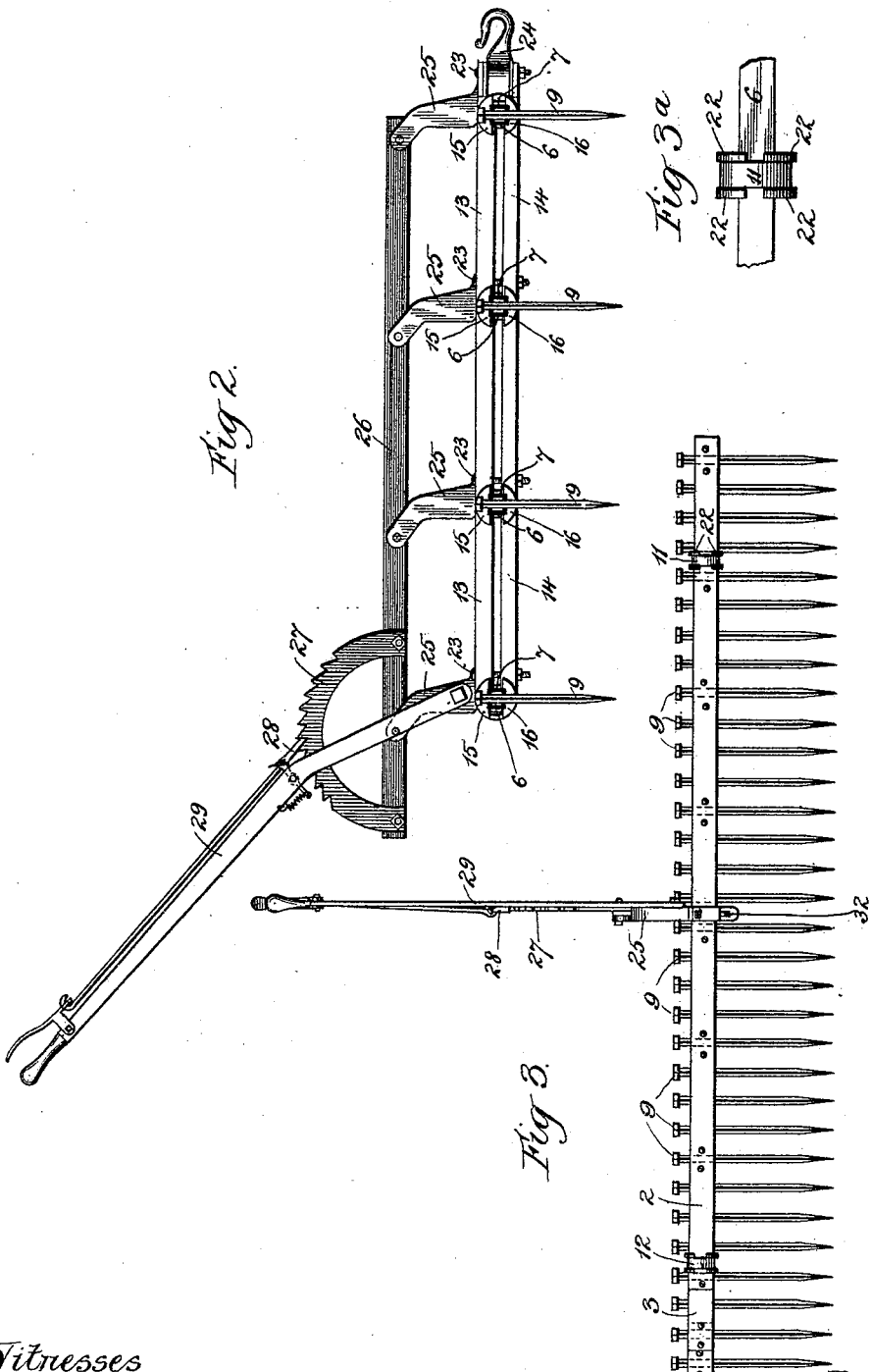
Witnesses
Wm. F. Henning
Wm. M. Theems
Inventor
John F. Packer
by Bond, Adams & Pickard
Attorneys.

(No Model.) 4 Sheets—Sheet 3.

J. F. PACKER.
HARROW.

No. 498,295. Patented May 30, 1893.

Witnesses
Wm. F. Henning
Wm. M. Rheem

Inventor
John F. Packer
by Bond, Adams & Pickard
Attorneys.

(No Model.)  4 Sheets—Sheet 4.
J. F. PACKER.
HARROW.
No. 498,295. Patented May 30, 1893.
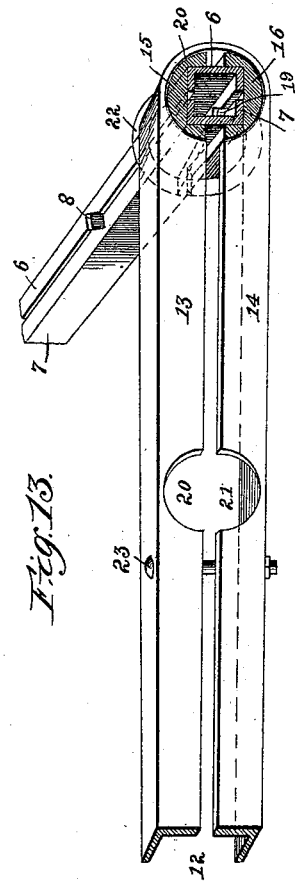
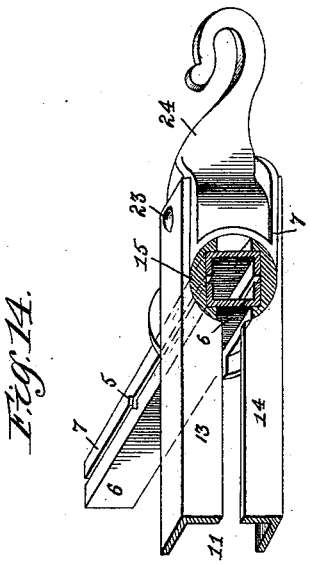
Witnesses.
Inventor.
John F. Packer
By Bond, Adams & Pickard
Att'ys

UNITED STATES PATENT OFFICE.

JOHN F. PACKER, OF LA GRANGE, ILLINOIS.

HARROW.

SPECIFICATION forming part of Letters Patent No. 498,295, dated May 30, 1893.

Application filed February 16, 1892. Serial No. 421,788. (No model.)

*To all whom it may concern:*

Be it known that I, JOHN F. PACKER, a citizen of the United States, residing at La Grange, in the county of Cook and State of Illinois, have invented certain new and useful Improvements in Harrows, of which the following is a specification, reference being had to the accompanying drawings, in which—

Figure 8:
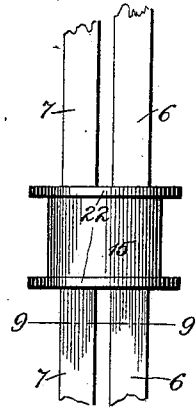
Figure 4:
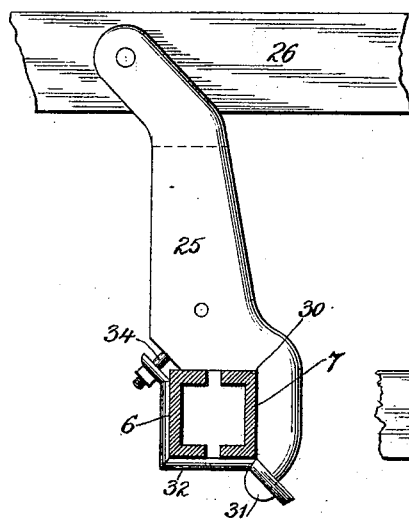
Figure 5:
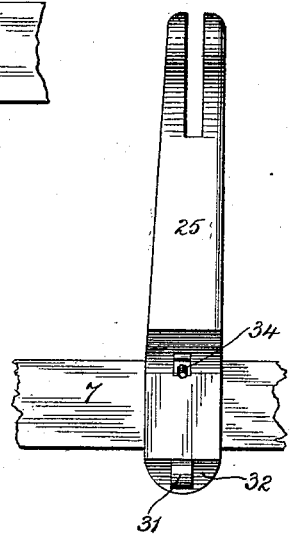
Figure 9:
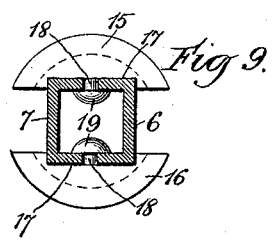
Figure 10:
Figure 6:
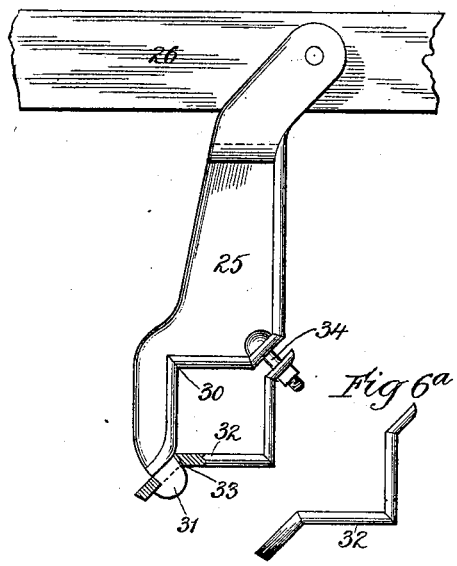
Figure 11:
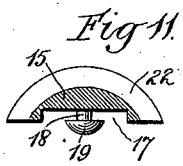
Figure 7:
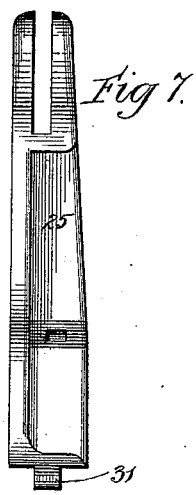
Figure 12:
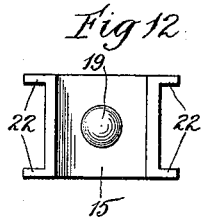

Figure 1 is a top or plan view. Fig. 2 is a side elevation. Fig. 3 is an end view. Fig. 3ª is a detail, being a view of one of the longitudinal connecting bars. Fig. 4 is an enlarged detail, being a side elevation of one of the arms for connecting the tooth bars to the connecting bars, the tooth bar being in section. Fig. 5 is an end elevation of the parts shown in Fig. 4. Fig. 6 is a view of the opposite side of the parts shown in Fig. 4, showing the method of securing the arm upon the tooth bar. Fig. 6ª is a detail, being a view of a portion of the clamp for securing the arm upon the tooth bar. Fig. 7 is a detail, being a view of the opposite side of the arm from that shown in Fig. 5. Fig. 8 is a top or plan view of a portion of one of the tooth bars, showing one of the filler blocks. Fig. 9 is a vertical cross section on line 9—9 of Fig. 8. Fig. 10 is a detail, being a side elevation of one of the filler blocks. Fig. 11 is a central vertical section of one of the filler blocks. Fig. 12 is an under side view of one of the filler blocks. Fig. 13 is a perspective view, showing the method of securing one end of the longitudinal connecting bars upon the tooth bars; and Fig. 14 is a perspective view, showing the method of securing the opposite end of the longitudinal connecting bars upon the tooth bars, and showing one of the draft hooks.

My invention relates to harrows, and its objects are to provide new and improved means for connecting the tooth bars of the harrow together; to provide new and improved filler blocks to form bearings to receive the connecting bars which connect the tooth bars, whereby the sections of the tooth bars will be held firmly together, while they will be permitted to be adjusted to adjust the angle of the teeth; to provide new and improved means for securing the operating arms to the tooth bars; and to otherwise improve the construction of harrows. I accomplish these objects as hereinafter specified and as illustrated in the drawings. That which I regard as new will be pointed out in the claims.

In the drawings,—1, indicates a harrow, which consists of a number of tooth-bars 2, 3, 4, and 5. I have shown the harrow as consisting of four bars, but any desired number may be used. Each of the tooth-bars consists of two channel bars 6 and 7, which are provided with sockets 8, adapted to receive and hold harrow teeth 9. The channel bars 6 and 7 are connected by means of rivets 10 at each side of each socket 8, as best shown in Fig. 1 and as described in my application of even filing date herewith. The tooth bars 2, 3, 4, and 5, are connected together by means of longitudinal connecting bars 11 and 12, one at each side of the harrow, as shown in Fig. 1. The connecting bars 11 and 12 each consist of a continuous angle bar, bent over upon itself to form an upper and lower section, 13 and 14, as best shown in Figs. 2 and 13, which sections serve to connect the tooth-bars and hold them in a fixed position with relation to each other.

To form suitable bearings for the tooth bars at the point where they are connected to the connecting bars 11 and 12, filler-blocks 15 and 16 are provided, one of which is placed on the upper side and the other on the under side of the tooth bar at the point where it is connected to the connecting bar, as best shown in Figs. 13 and 14. The filler blocks 15 and 16 are semicircular in cross section, as shown in Figs. 9 and 10, and are provided with recesses 17, adapted to fit over the upper surface of the tooth bar, as best shown in Fig. 9.

18, indicates a pin, having a head 19, which pin is rigidly secured to the central part of the recess 17 of the filler block, as best shown in Fig. 10, the shank of which pin is adapted to fit into the slot between the channel bars 6 and 7 which compose the tooth-bars. By this construction the filler blocks are held rigidly upon the tooth bars, and they also serve to more firmly unite the channel bars of the tooth bar. The size of the two filler blocks 15 and 16 is such that their outer surfaces will be arcs of the same circle. The sections 13 and 14 of each connecting bar are provided at suitable points with semicircular recesses 20 and 21, adapted to form bearings to receive the filler blocks 15 and 16, as best shown in Figs. 13 and 14. By this construction the tooth bars are held in proper position, and they may be partially rotated to adjust the angle of the harrow teeth. The filler blocks 15 and 16 are provided with flanges 22 for preventing them from working out of place. The sections 13 and 14 of each connecting bar are held at a proper distance from each other by bolts 23, as best shown in Figs. 2 and 13.

A draft hook 24 is secured at one end of each longitudinal connecting bar 11 and 12, as best shown in Figs. 2 and 14. Each tooth bar 2, 3, 4 and 5, is provided, preferably near its center, with an arm 25, as best shown in Fig. 2, which arms are in line with each other and are connected at their upper ends by means of a connecting bar 26 which is pivoted to them. The connecting bar 26 is provided with a notched segment 27, in which operates a dog 28, carried by a lever 29, in the usual manner. The lower end of the lever 29 is connected to the adjacent arm 25, as best shown in Fig. 2. By operating the lever 28, the teeth 9 may be turned to any desired angle and secured at such angle by means of the dog 28 in the segment 27, in the usual manner. The lower end of each arm 25 is provided with a rectangular recess 30, adapted to fit upon two sides of the tooth bar, as best shown in Figs. 4 and 6, and a hook or lug 31 is provided on the extreme lower end.

32, indicates a rectangular plate, one end of which is provided with a slot 33, adapted to receive the hook 31 in the arm 25, as best shown in Fig. 6. The other end of the plate 32 is perforated to receive a bolt 34, which passes through such plate and through a portion of the arm 25 in which it is secured, as best shown in Fig. 6. The shape of the plate 32 is such that when it is secured to the arm 25 opposite the recess 30 in said arm, a rectangular socket will be formed, adapted to receive a tooth bar, as best shown in Fig. 4. By securing a nut upon the bolt 34, the plate 32 may be drawn tightly against the tooth bar, thereby holding the arm 25 rigidly in position. When it is desired to remove the arm 25 from the tooth bar, by removing the bolt 34 the plate 32 may be removed and the tooth bar thereby released.

I have shown and described the arm 25 as having a rectangular recess 30 and the plate 32 as having a similar recess; but I do not wish to limit myself to a recess of any particular shape, the only limitation being that the arm 25 and plate 32 be so shaped as to be adapted to clasp and firmly hold the tooth bar. Instead of placing the hook 31 on the arm 25 and the slot 33 in the plate 32, the hook may be placed on the plate 32 and the slot in the arm 25, as such construction would be the full equivalent of the construction shown.

That which I claim as my invention, and desire to secure by Letters Patent, is—

1. The combination with tooth bars, of longitudinal connecting bars each composed of a single continuous angle bar bent back upon itself to form an upper and a lower section and having semi-circular recesses containing filler blocks which receive the tooth bars, and means for securing the upper and lower angle bar sections together, substantially as described.

2. The combination with tooth bars each composed of two channel bars 6 and 7 separated by a slot, of longitudinal connecting bars each composed of a single continuous angle bar bent back upon itself to form an upper and a lower section and having semi-circular recesses, and filler blocks 15 and 16 each having recesses 17, from the bottom of which extends a pin 18 having a head 19, said pins fitting the slot between the channel bars, substantially as described.

3. The combination with a harrow tooth bar composed of two channel bars separated by a slot, of semi-circular filler blocks 15 and 16 each having a recess 17 from the bottom of which extends a pin 18 having a head 19, said pins fitting the slots between the channel bars, substantially as described.

4. The combination with tooth bars, of longitudinal connecting bars each composed of a single continuous angle bar bent back upon itself to form an upper and a lower section and having semi-circular recesses, means for securing the upper and lower angle bar sections together, and semi-circular filler blocks 15 and 16 arranged in the semi-circular recesses of the connecting bars and each block having a recess 17 from the bottom of which extends a pin 18 having a head 19 which engages a tooth bar, substantially as described.

5. The combination with harrow tooth bars, and a connecting bar 26, of arms 25 each having an angular recess and a hook 31 at its lower end, an angular plate 32 having at one end a slot 33 which receives the hook of the arm and at the opposite end provided with an adjustable bolt connection with the arm for securing a tooth bar, substantially as described.

JOHN F. PACKER.

Witnesses:
JOHN L. JACKSON,
NELLIE MCKIBBEN.